UNITED STATES PATENT OFFICE.

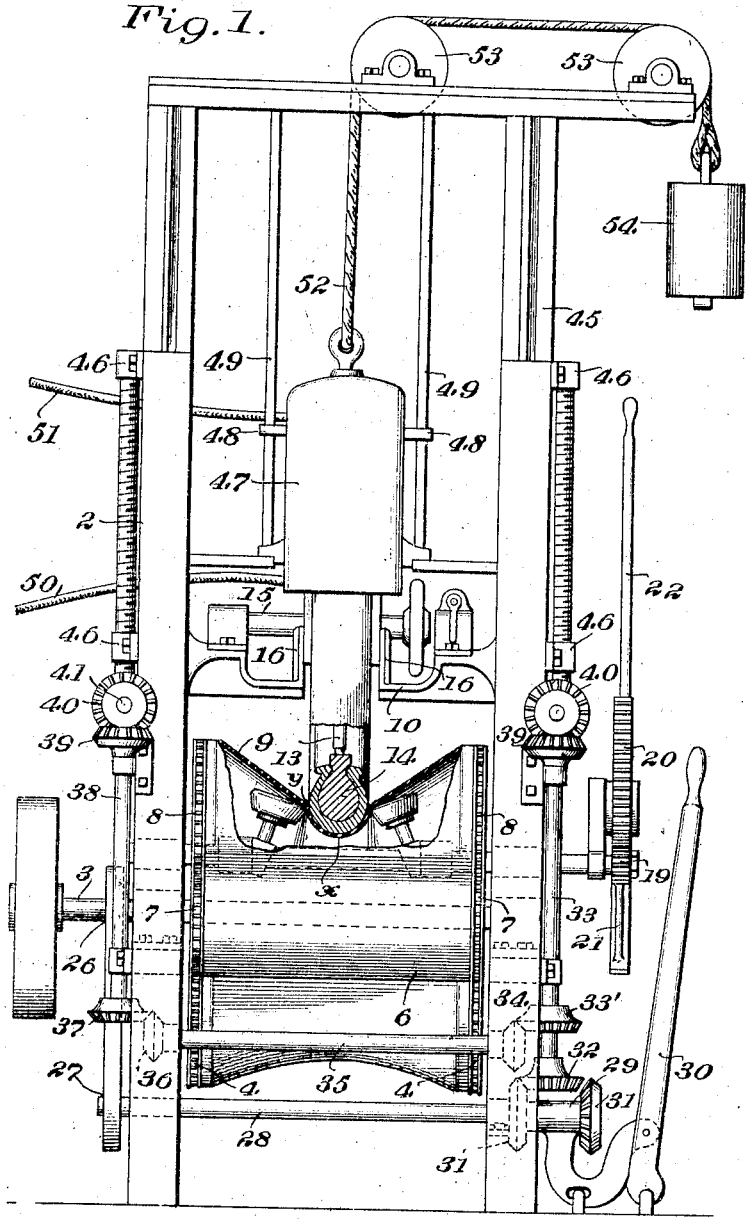

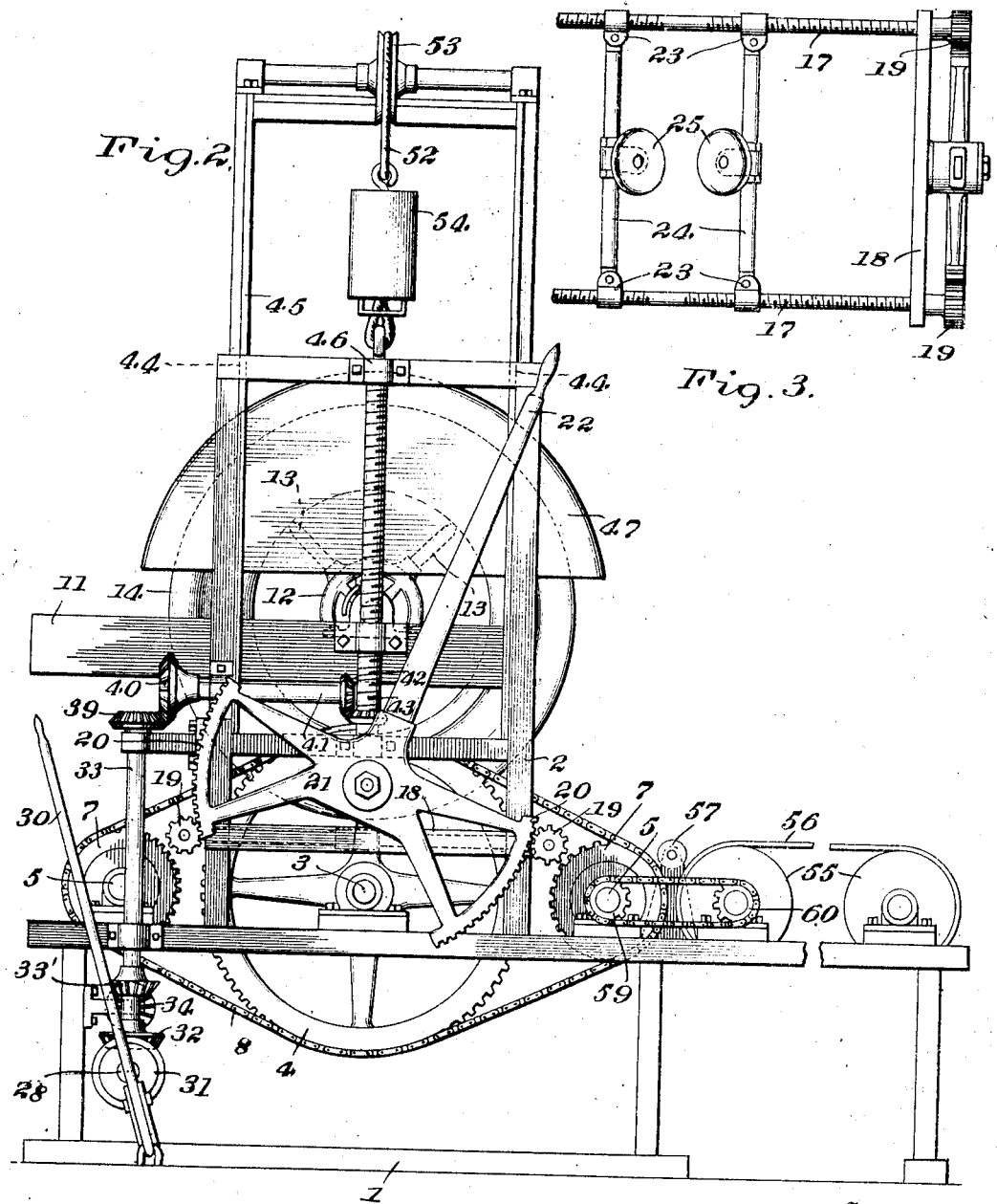

EMRYS T. WILLIAMS, OF AKRON, OHIO.

APPARATUS FOR MANUFACTURING RUBBER TIRES, &c.

1,041,544.

Specification of Letters Patent.

Patented Oct. 15, 1912.

Application filed November 5, 1910. Serial No. 590,852.

*To all whom it may concern:*

Be it known that I, EMRYS T. WILLIAMS, a citizen of the United States, residing at Akron, in the county of Summit and State of Ohio, have invented new and useful Improvements in Apparatus for Manufacturing Rubber Tires, &c., of which the following is a specification.

This invention relates to improvements in apparatus for manufacturing articles of rubber in which the layers of rubber are applied to a mandrel or core and then by means of a suitable device pressed to form on the mandrel, and it relates particularly to tire casings or sheaths, the object being to provide an apparatus of this character having means for effectively performing the several operations necessary to build the complete tire-sheath or other article.

With the above object in view the invention consists in the novel features of construction hereinafter fully described, particularly pointed out in the claims, and clearly illustrated by the accompanying drawings, in which—

Figure 1 is an end-elevation of a machine or apparatus constructed in accordance with my invention, the elastic forming-apron being broken away to show the forming-wheels; Fig. 2, a side-elevation of the machine, and Fig. 3, a plan view of the mechanism for effecting the movement of the forming wheels.

In the larger sizes of pneumatic tires, the tread is formed of two parts, a "breaker strip" consisting of a thin layer of unvulcanized rubber on which is mounted a heavy piece of fabric and a heavy strip of rubber convex on its outer side which constitutes the tread proper. The breaker strip is applied to the outer circumference of the carcass, a suitable adhesive cement intervening. On the outer surface of this strip, the tread proper is applied. Heretofore, these two portions have been put on by hand and by this method air is not infrequently retained between the parts, thus preventing perfect contact. By the use of my invention the parts are applied evenly without distorting or stretching the same, and all air is forced out and a perfect contact insured.

Referring now more particularly to said drawings, the numeral 1 designates the supporting frame raised from which is an upright frame 2. Extending transversely of the machine between the upright-frame 2, is a shaft 3 mounted in suitable bearings on the base-frame 1 and carrying the large sprockets 4 which are disposed between the sides of the upright frame. Shafts 5 are disposed on the respective sides of the shaft 1 and extend parallel thereto and are mounted in suitable bearings on the base 1. These shafts carry cylinders 6 having at their ends sprockets 7 which are alined with the sprockets 4. Passing around each sprocket 4 and the sprockets 7 alined therewith is a chain 8. Stretched over the cylinders and transversely between the chains 8 is an elastic apron or forming-member 9 which is attached to and supported by the chains.

Attached to the inner sides of a frame 45 presently to be described, which slides on the upright-frame 2, are brackets 10 which support a track 11 extending outside of said frame and located above the elastic apron.

The mandrel or core consists of a hub 12 carrying radially extending spokes 13 which are threaded into the hub and support the rim 14 which is of proper contour to constitute a core or mandrel for the casing or sheath. The hub has the axes 15 projecting therefrom which turn on centers 16 carried by the brackets 10. To place the mandrel or core in the machine or remove the same therefrom, it is rolled along the track 11, the axes 15 moving thereon. The mandrel is adapted to be moved by the sliding frame in which it is supported to extend downward into the space normally occupied by the elastic apron, thereby causing the latter at the point of contact to assume the shape of the mandrel and grip it tightly. The mandrel is thus caused to revolve as the apron is rotated.

Referring now more particularly to Fig. 3, the numeral 17 designates two parallel screw-shafts, the threads on one-half of each of which is disposed oppositely to that on the other half. These shafts are supported in plates 18 carried by the upright-frame 2 and each carries at one end, a gear 19. These gears 19 mesh with segmental-gears 20 formed on an intermediately pivoted lever 21 having a hand-lever 22 for operating it. Movable on the shafts are nuts 23 carrying arms or supports 24 on which the opposing forming-wheels 25 are mounted. These wheels have notched bushings which engage with shoulders on the safts whereby said weels may be adjusted at various angles to the arms or supports 24. By means of the segmental-lever the wheels may be quickly and readily moved to and from each other. The purpose of these wheels is to force the elastic apron farther up along the core or mandrel thereby completely enveloping that part of the surface of the carcass of the tire which is to be covered by the tread. It will be readily seen that when the apron and core are rotated and a strip of unvulcanized rubber fed into the elastic-walled cavity formed by the apron, carcass and wheels 25, said strip must take on the side next to the carcass, the exact contour of the latter, particularly if said wheels are given an initial contact at the point marked $x$ and gradually follow up along the periphery of the carcass until point $Y$ is reached, mechanism for that purpose being hereinafter described. Thus the air is excluded between the carcass and strip, the rolling carcass forcing the air out longitudinally by virtue of the depression it makes in the apron, and the forming-wheels forcing the air ahead of them. The pressure caused by the tension of the apron seals the rubber strip firmly to the carcass. The forming wheels are fed upward along the periphery of the carcass by an adjustment of the core or mandrel.

The shaft 3 which is the main drive-shaft carries a pulley 26 which is belted to a pulley 27 on an idler-shaft 28 mounted in the base 1. A clutch 29 is slidably attached to the end of this idler-shaft and is operated by a lever 30. Said clutch operates bevel-gears 31 which are moved into and out of contact with a bevel-gear 32 on the lower end of a vertical-shaft 33 mounted on the upright frame. A gear 33' carried also by shaft 33 meshes with a bevel-gear 34 on one end of a shaft 35 mounted in the base 1. This shaft 35 carries a bevel-gear 36 on its opposite end which meshes with a similar gear 37 on the lower end of a vertical shaft 38 on the opposite side of the upright frame to shaft 33. Shafts 33 and 38 carry on their upper ends, bevel-gears 39 which mesh with similar gears 40 on horizontal shafts 41 suitably mounted on the upright-frame. Bevel-gears 42 on these shafts 41 mesh with similar gears on the lower ends of screw-shafts 43 which are suitably mounted on the upright frame. The upright frame is provided with vertical ways 44 in which the V-shaped projections 45 of a sliding-frame 45 move. The sliding-frame carries nuts or screw-threaded sleeves 46 which engage the screw-shafts so that as the latter are rotated the frame is raised or lowered, carrying with it, the core or mandrel and thus effecting the movement of the same relatively to the forming-wheels causing the latter to feed upward along the periphery of the carcass. Reverse motion is imparted to the screw-shaft by operating the clutch to bring either one or the other of the bevel-gears 31 carried thereby into contact with the bevel-gear 32 on the lower end of shaft 33. The sliding-frame 45 also carries the steam-jacket 47 which is supported by brackets 48 and guide-rods 49 which depend from the upper cross-bar of the frame and on which the jacket may be raised and lowered. The jacket is of such form as to inclose a portion of the periphery of the core or mandrel and is provided with flexible connections 50 and 51 forming inlets and outlets for the steam. This jacket is raised and lowered independently of the core by means of a cable 52 which passes over sheaves 53 and carries a counterweight 54.

For feeding the rubber forming the tread to the apron, I provide the pulleys 55 and endless belt 56, the latter having a longitudinal recess therein of sufficient width and depth to contain the rubber-tread and hold it in alinement with the elastic apron. A roller 57 is provided at the inner end of the conveyer belt to keep the tread from sagging in crossing the gap between the belt and apron. The belt is actuated by a sprocket chain 58 which passes around sprockets 59 and 60 carried respectively by one of the pulleys 55 and shafts 5.

In operation the tread-stock is placed on the carrier belt. A core or mandrel upon which a carcass has been mounted is then rolled by means of the tracks 11 into position between the centers 16, cement having been applied to the outer periphery of said carcass. The core is permitted to depress the apron to a certain depth. The breaker strip having been put on the conveyer belt, power is applied to the pulley 61 on the main drive-shaft and said strip is fed to the carcass. After one revolution, the forming-wheels are fed in a little at each successive revolution and at the same time the core is made to depress the apron a little more. The heavy strip of rubber to form the tread is then placed on the belt and the core raised and the operation is repeated the same as in the case of the breaker strip. Just before a complete revolution is made the rear end of the stock is trimmed so that the ends may be butted, and the revolution then completed. After several revolutions are made the heating jacket is lowered over the upper portion of the tread and the heat renders the rubber sufficiently plastic for the forming-wheels to thin down the edges, a few revolutions only being necessary to complete the operation. The core with the tire thereon is then removed for the vulcanization of the latter.

It will thus be seen that the operation of placing the tread on the carcass of the tire is accomplished by having said tread interposed between an elastic apron and the carcass and by depressing said carcass into the elastic apron to a suitable depth, together with the inward pressure of the wheels, forming a cavity of the required shape for the tread and insuring perfect contact of the tread and contour of the finished tire.

Having thus described my invention, what I claim as new and desire to secure by Letters Patent, is:

1. A machine of the character described comprising an elastic apron, a core or mandrel adapted to engage said apron and press it out of its normal plane at the point of contact, means on the opposite side of the apron to the core for causing the apron to conform to contour of the core when said apron is engaged by the latter, and means for effecting the movement of the first-mentioned means to exert a pressure along the apron where it contacts with the core or mandrel.

2. A machine of the character described comprising a core or mandrel, an elastic medium adapted to be engaged by the core, and adjustable members arranged on the opposite side of the elastic medium to the core, for the purpose set forth.

3. A machine of the character described comprising a mandrel or core, an elastic apron, and spaced wheels acting upon the apron to coöperate with the mandrel to form a mold.

4. A machine of the character described comprising a mandrel of permanent form, a rotary elastic apron, and spaced wheels acting upon said apron to coöperate with the mandrel to form a mold.

5. A machine of the character described comprising a mandrel of permanent form, an elastic apron, spaced wheels acting upon said apron to coöperate with the mandrel to form a mold, and means for simultaneously adjusting said wheels with relation to the mandrel.

6. A machine of the character described comprising a mandrel of permanent form, an elastic apron, spaced wheels acting upon said apron to coöperate with the mandrel to form a mold, and screw mechanism for simultaneously moving said wheels with relation to the mandrel.

7. A machine of the character described comprising a mandrel, an elastic apron co-acting therewith, spaced wheels acting upon the apron to coöperate with the mandrel to form a mold, and means for altering the angle of inclination of said wheels.

8. A machine of the class described comprising a mandrel, an elastic apron co-acting therewith, spaced wheels acting upon said apron to coöperate with the mandrel to form a mold, means for altering the angle of inclination of said wheels, and means for simultaneously adjusting said wheels relative to the mandrel.

9. A machine of the character described comprising a mandrel, a mold, and a steam jacket, said parts being relatively movable to cause the jacket to partially embrace the mandrel during operation.

10. A machine of the class described comprising a rotatable mandrel, a mold, and a steam jacket vertically adjustable into heating relation with said mandrel.

11. A machine of the character described comprising a rotatable mandrel, a mold, and a counterweighted steam jacket vertically adjustable into heating relation with said mandrel.

12. A machine of the character described comprising a rotatable mandrel, a mold, an axle upon which said mandrel is mounted, and tracks upon which said mandrel may be rolled into coöperative position with the mold.

In testimony whereof, I affix my signature in the presence of two witnesses.

EMRYS T. WILLIAMS.

Witnesses:
G. S. HOWARTH,
AMOS H. ENGLEBEEK.